US012174590B2

(12) United States Patent
Masaki et al.

(10) Patent No.: US 12,174,590 B2
(45) Date of Patent: Dec. 24, 2024

(54) ELECTRONIC WATCH

(71) Applicant: Seiko Epson Corporation, Tokyo (JP)

(72) Inventors: Takaya Masaki, Matsumoto (JP); Kiyoto Takeda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 422 days.

(21) Appl. No.: 17/645,367

(22) Filed: Dec. 21, 2021

(65) Prior Publication Data

US 2022/0197223 A1 Jun. 23, 2022

(30) Foreign Application Priority Data

Dec. 22, 2020 (JP) ................................ 2020-212194

(51) Int. Cl.
*G04C 3/00* (2006.01)
*G04C 10/00* (2006.01)

(52) U.S. Cl.
CPC ............ *G04C 3/008* (2013.01); *G04C 10/00* (2013.01)

(58) Field of Classification Search
CPC ..................................................... G04C 10/00
See application file for complete search history.

(56) References Cited

U.S. PATENT DOCUMENTS

| | | | | |
|---|---|---|---|---|
| 6,310,836 B1 | 10/2001 | Fujii et al. | | |
| 2005/0169112 A1* | 8/2005 | Shimizu ................ | G04C 10/00 368/255 | |
| 2015/0268639 A1 | 9/2015 | Abe et al. | | |
| 2016/0179061 A1 | 6/2016 | Abe et al. | | |
| 2017/0168462 A1* | 6/2017 | Ryu ...................... | G04G 17/02 | |
| 2019/0387288 A1* | 12/2019 | Scordilis ............. | G04G 9/0064 | |

FOREIGN PATENT DOCUMENTS

| | | |
|---|---|---|
| JP | S51-124471 A | 10/1976 |
| JP | S52-117165 A | 10/1977 |
| JP | S62-004639 U | 1/1987 |
| JP | S63-289480 A | 11/1988 |
| JP | H11-040182 A | 2/1999 |
| JP | 2015-175805 A | 10/2015 |
| JP | 2017-146266 A | 8/2017 |
| JP | 2018-163166 A | 10/2018 |
| JP | 2020-134141 A | 8/2020 |
| JP | 2020-134276 A | 8/2020 |

* cited by examiner

*Primary Examiner* — Renee S Luebke
*Assistant Examiner* — Matthew Hwang
(74) *Attorney, Agent, or Firm* — Harness, Dickey & Pierce, P.L.C.

(57) ABSTRACT

An electronic watch includes a hand configured to indicate time, a dial including a mark, a movement including a hand shaft configured to rotate the hand and a motor configured to rotate the hand shaft, and a battery configured to supply power to the motor, wherein the battery is disposed between the dial and the movement, and has a first opening through which the hand shaft passes.

10 Claims, 7 Drawing Sheets

ELECTRONIC WATCH

The present application is based on, and claims priority from JP Application Serial Number 2020-212194, filed Dec. 22, 2020, the disclosure of which is hereby incorporated by reference herein in its entirety.

BACKGROUND

1. Technical Field

The present disclosure relates to an electronic watch.

2. Related Art

An electronic watch with a battery has been widely used. As indicated in JP-A-2018-163166, a shape of a battery is often a button shape. A movement is provided with a motor, a torque transmission mechanism by a toothed gear, a mechanism for rotating a hand by rotation of a setting stem, a printed wired board that drives the motor, and an area for housing a battery.

As disclosed in JP-A-2018-163166, when the battery is disposed in the movement, a thickness and a size of the battery are great constraints, and thus a reduction in thickness and size of the movement is limited.

SUMMARY

An electronic watch includes a hand configured to indicate time, a dial having a through hole through which a hand shaft configured to rotate the hand passes, a movement including the hand shaft configured to rotate the hand, a motor configured to rotate the hand shaft, and a circuit electrically coupled to the motor, and a battery electrically coupled to the circuit and configured to supply power to the motor, wherein the battery is disposed between the dial and the movement, and has a first opening through which the hand shaft passes.

DESCRIPTION OF EXEMPLARY EMBODIMENTS

First Exemplary Embodiment

Figure 1:
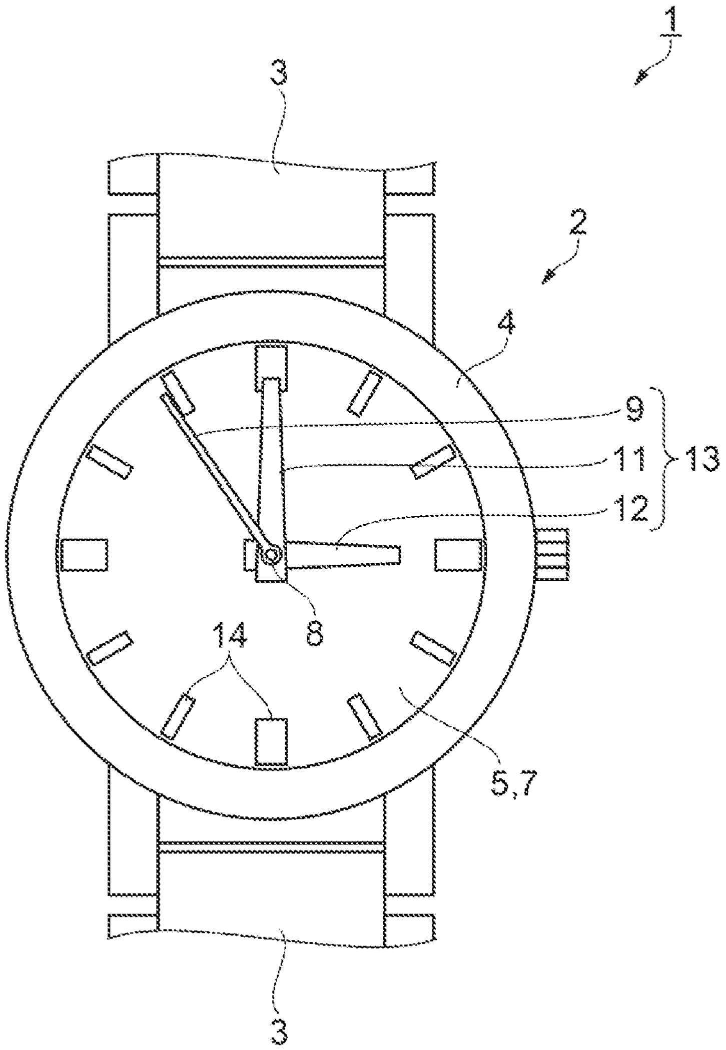
FIG. 1 is a schematic plan view illustrating a configuration of an electronic watch according to a first exemplary embodiment.

As illustrated in FIG. 1, an electronic watch 1 includes a watch body 2 and a watch strap 3. The watch strap 3 coupled to the watch body 2 is disposed on an upper side and a lower side of the watch body 2 in the diagram. The watch strap 3 is used to wrap around a human arm.

Figure 2:
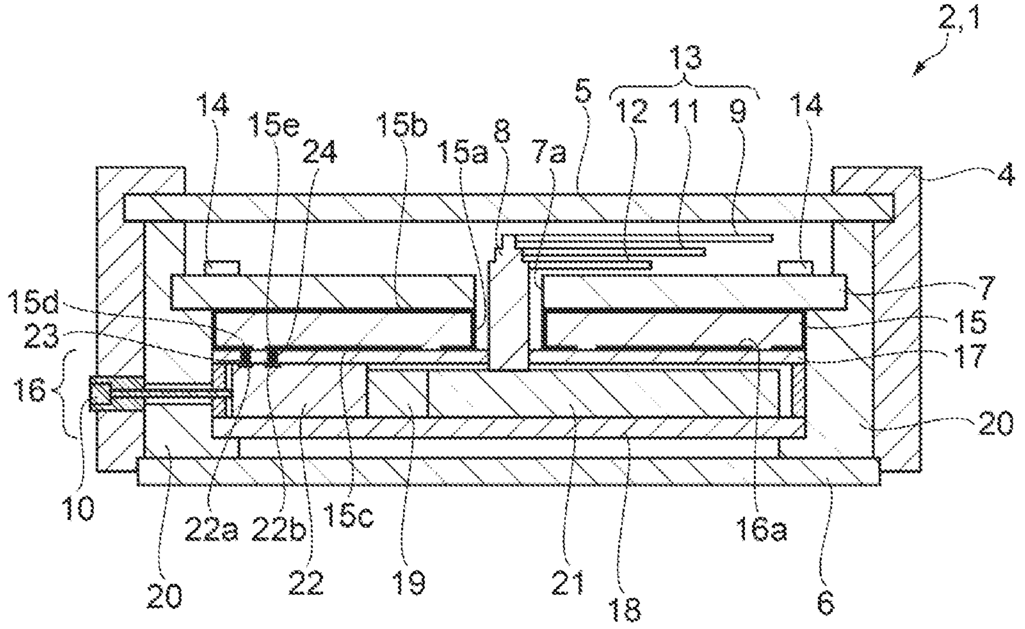
FIG. 2 is a schematic side cross-sectional view illustrating a configuration of the electronic watch.

As illustrated in FIGS. 1 and 2, the watch body 2 includes a cylindrical outer case 4. A cover glass 5 is disposed at one end along an axis of the outer case 4, and a case back 6 is disposed at the other end. The cover glass 5 side of the electronic watch 1 is a front surface side, and the case back 6 side is a back surface side.

A dial 7 is disposed on a back surface side of the cover glass 5. A hand shaft 8 is disposed at the center of the dial 7 in plan view of the dial 7. A seconds hand 9, a minute hand 11, and an hour hand 12 indicating time are attached to the hand shaft 8. Hereinafter, the seconds hand 9, the minute hand 11, and the hour hand 12 are referred to as a hand 13.

The hand shaft 8 is formed of three rotary shafts to which the seconds hand 9, the minute hand 11, and the hour hand 12 are attached. The hand 13 rotates about the hand shaft 8. The cover glass 5 is transparent, and the dial 7 and the hand 13 are visible through the cover glass 5.

A first through hole 7*a* is formed at the center of the dial 7. The hand shaft 8 passes through the first through hole 7*a*. The dial 7 includes a mark 14. The mark 14 is disposed concentrically about the first through hole 7*a*. The mark 14 is disposed every 30 degrees. The hand 13 indicates time with the mark 14 as a graduation.

A battery 15 is disposed on a back surface side of the dial 7. A movement 16 is disposed on a back surface side of the battery 15. The movement 16 includes a main plate 17, a train wheel bridge 18, a motor 19, a circuit portion 22 as a circuit, a train wheel mechanism 21, and the hand shaft 8. The motor 19 and the train wheel mechanism 21 are disposed between the main plate 17 and the train wheel bridge 18. The train wheel mechanism 21 transmits torque of the motor 19 to the hand shaft 8. The hand shaft 8 is a part of the movement 16. The motor 19 and the train wheel mechanism 21 rotate the hand shaft 8. A guide frame 20 is disposed between the dial 7, the battery 15, and the movement 16, and the outer case 4. A position of the dial 7, the battery 15, and the movement 16 in a thickness direction of the watch body 2 is determined by the guide frame 20. Note that the battery 15 may be fixed to the dial 7 by adhesion or the like, and the battery 15 may be fixed to the movement 16 by adhesion or the like.

The circuit portion 22 is disposed on a back surface side of the main plate 17. The circuit portion 22 is electrically coupled to the motor 19. The circuit portion 22 outputs a drive current that drives the motor 19.

The battery 15 is disposed between the dial 7 and the movement 16, and has a first opening 15*a* through which the hand shaft 8 passes. The first opening 15*a* is a through hole. The first opening 15*a* and the first through hole 7*a* are disposed so as to overlap each other, and the hand shaft 8 passes through both of the first opening 15*a* and the first through hole 7*a*. The battery 15 is electrically coupled to the circuit portion 22, and supplies power to the motor 19. A power supply connector 10 is disposed on a side surface of the outer case 4. The power supply connector 10 is electrically coupled to the circuit portion 22. The battery 15 is electrically coupled to the power supply connector 10, and power is supplied from the power supply connector 10.

According to this configuration, the battery 15 is disposed between the dial 7 and the movement 16. The hand shaft 8 passes through the first opening 15*a* of the battery 15, and the hand shaft 8 rotates the hand 13 disposed on the dial 7 side. Therefore, the battery 15 does not need to be disposed in the movement 16, and thus the movement 16 can be made thinner and smaller.

According to this configuration, since the battery 15 has the first opening 15*a* as a through hole, the battery 15 can be disposed between the movement 16 and the dial 7.

The battery 15 includes a first surface 15*b* on the dial 7 side and a second surface 15*c* on the main plate 17 side. The battery 15 includes a first electrode 15*d* and a second electrode 15*e* on the second surface 15*c*. The circuit portion 22 includes, on a surface facing the battery 15, a third electrode 22*a* as an electrode and a fourth electrode 22*b* as an electrode.

A first spring 23 is disposed between the first electrode 15*d* and the third electrode 22*a*. The first spring 23 electrically couples the first electrode 15*d* and the third electrode 22*a*. A second spring 24 is disposed between the second electrode 15*e* and the fourth electrode 22*b*. The second spring 24 electrically couples the second electrode 15*e* and the fourth electrode 22*b*. A through hole is formed in the main plate 17 at a place where the first spring 23 and the second spring 24 are disposed. Thus, even with the main plate 17 between the battery 15 and the circuit portion 22, the first spring 23 and the second spring 24 can electrically couple the battery 15 and the circuit portion 22. Note that, when the battery 15 is adhesively fixed to the movement 16, stability of electrical coupling between the battery 15 and the movement 16 can be improved.

In this way, the movement 16 includes, at an upper surface 16*a* side facing the battery 15, the third electrode 22*a* and the fourth electrode 22*b* that are electrically coupled to the battery 15. According to this configuration, when the movement 16 includes the third electrode 22*a* and the fourth electrode 22*b* on the upper surface 16*a*, the third electrode 22*a* and the fourth electrode 22*b* are disposed on the surface on the battery 15 side, thereby facilitating electrical coupling to the battery 15.

In plan view viewed from an axial direction of the hand shaft 8, the size of the battery 15 is the same as that of the movement 16. According to this configuration, by adopting the battery 15 as a battery having the same size as that of the movement 16 in the plan view viewed from the axial direction of the hand shaft 8, a larger battery can be adopted than when the battery 15 is included in the movement 16, and thus capacity of the battery 15 can be increased. Note that "the same" also includes "substantially the same".

The battery 15 is an all-solid battery. According to this configuration, since the battery 15 is an all-solid battery, a leak does not need to be taken into consideration, and thus safety can be ensured.

Figure 3:
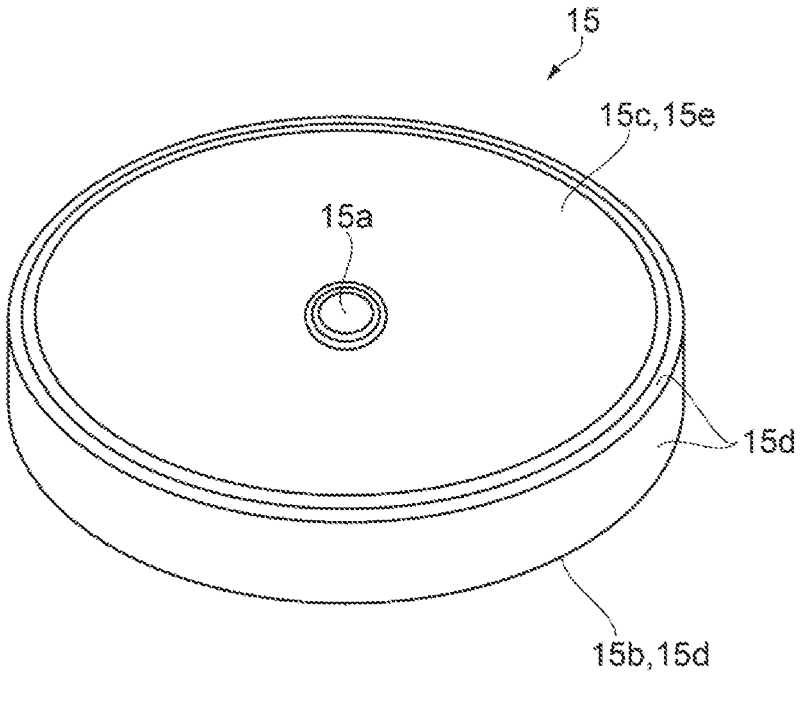
FIG. 3 is a schematic perspective view illustrating a configuration of a battery.

Next, the battery 15 will be described according to FIGS. 3 to 6. The battery 15 is an all-solid lithium secondary battery. As illustrated in FIG. 3, the battery 15 includes the first electrode 15*d* having a bottomed cylindrical shape and the second electrode 15*e* having a circular shape. The first electrode 15*d* is a container, and the second electrode 15*e* is a lid. One of the first electrode 15*d* and the second electrode 15*e* is a positive electrode, and the other is a negative electrode. The first spring 23 is electrically coupled to the first electrode 15*d*. The second spring 24 is electrically coupled to the second electrode 15*e*. The battery 15 is an electrically chargeable all-solid secondary battery, but may also be used as a primary battery.

Figure 4:
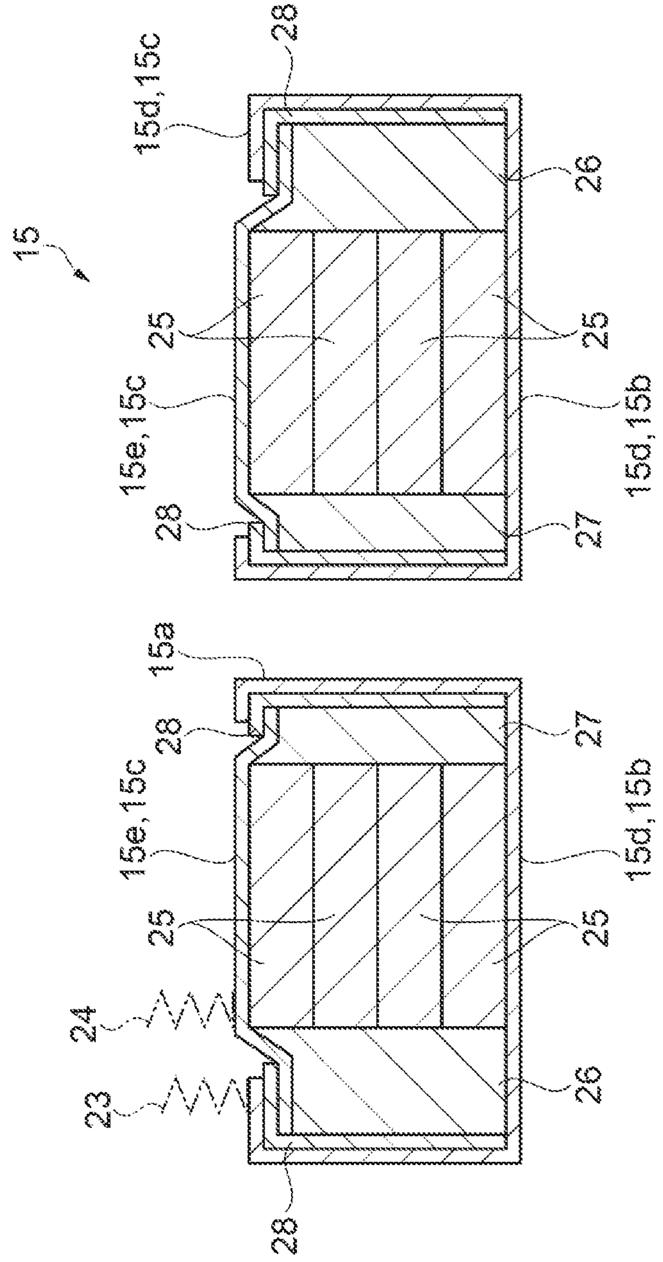
FIG. 4 is a schematic side cross-sectional view illustrating a structure of the battery.

As illustrated in FIG. 4, four disk-shaped battery units 25 overlap each other and are installed in the first electrode 15*d*. The battery units 25 overlap each other in a cylindrical shape. The number of the battery units 25 installed in one battery 15 is not particularly limited. The battery unit 25 is used between about 2.8 v and about 4.2 v. By using a combination of parallel coupling and series coupling of the plurality of battery units 25, a voltage value needed for the battery 15 can be adjusted.

A cylindrical first insulating portion 26 is installed on an outer circumference of the overlapped battery units 25, and a second insulating portion 27 is installed on an inner circumference. The second electrode 15*e* is installed on an upper side of the battery units 25, the first insulating portion 26, and the second insulating portion 27 in the diagram, and a third insulating portion 28 is installed on an outer circumferential side of the second electrode 15*e* and on a side surface side of the first insulating portion 26. The third insulating portion 28 is disposed between the first electrode 15*d* and the second electrode 15*e*, and is also disposed between the first electrode 15*d* and the first insulating portion 26. Furthermore, the third insulating portion 28 is installed on an inner circumferential side of the second electrode 15*e* and on a side surface side of the second insulating portion 27. Even in the vicinity of the first opening 15*a*, the third insulating portion 28 is disposed between the first electrode 15*d* and the second electrode 15*e*, and is also disposed between the first electrode 15*d* and the second insulating portion 27.

The first insulating portion 26 and the second insulating portion 27 fix the battery units 25 such that the battery units 25 do not move in a left-and-right direction in the diagram. Furthermore, the first insulating portion 26 and the second insulating portion 27 perform insulation such that the side surface of the battery units 25 does not conduct with the first electrode 15*d*. The third insulating portion 28 insulates the first electrode 15*d* and the second electrode 15*e*. A material of the first electrode 15*d* and the second electrode 15*e* is stainless steel. A material of the first insulating portion 26, the second insulating portion 27, and the third insulating portion 28 is insulating acrylic resin.

Figure 5:
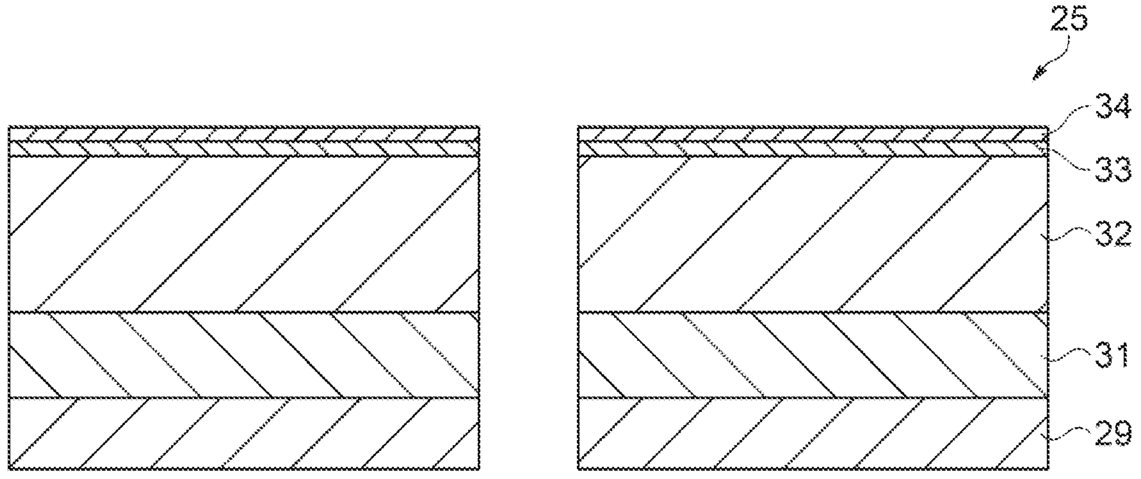
FIG. 5 is a schematic side cross-sectional view illustrating a structure of a battery unit.

As illustrated in FIG. 5, the battery unit 25 includes a lower electrode 29. Then, a carbon sheet 31, an electrode composite 32, a separation film 33, and an upper electrode 34 are installed on the lower electrode 29 so as to overlap each other in this order.

The lower electrode 29 is an electrode that serves as a positive electrode, and functions as a substrate that maintains a structure. A material of the lower electrode 29 is copper. The carbon sheet 31 is a carbon film that efficiently flows a current between the lower electrode 29 and the electrode composite 32.

The separation film 33 is a film that prevents a short circuit between the electrode composite 32 and the upper electrode 34, and is a film formed of LBO (lithium triborate), LCBO (lithium carbon borate), and the like. In the present exemplary embodiment, for example, LCBO is adopted for the separation film 33. Further, the upper electrode 34 is an electrode that serves as a negative electrode, and is a lithium film.

Figure 6:
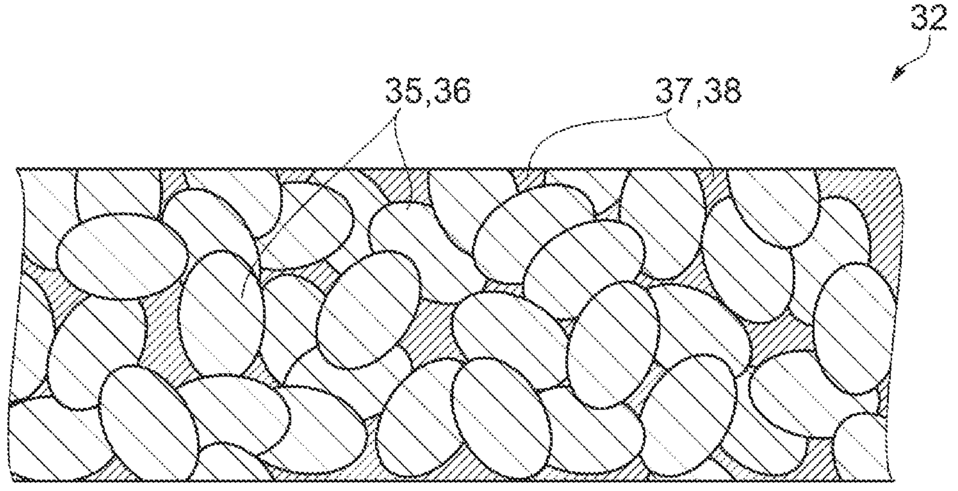
FIG. 6 is a schematic side cross-sectional view of main portions illustrating a structure of an electrode composite.

As illustrated in FIG. 6, the electrode composite 32 includes an active material forming body 35. The active material forming body 35 is a structure in which a plurality of active material particles 36 being a formation material are coupled and formed to be porous. A communication hole 37 is located between the active material particles 36. The communication hole 37 is in the form of a hole in which cavities between the active material particles 36 communicate in a mesh pattern.

The communication hole 37 is filled with a non-crystalline solid electrolyte 38. Since the communication hole 37 is installed in a mesh pattern, the active material forming body 35 and the solid electrolyte 38 are in contact with each other over a wide area. Thus, lithium ions easily move between the active material forming body 35 and the solid electrolyte 38.

Further, the solid electrolyte 38 fills the communication hole 37 between the active material forming bodies 35. Therefore, the solid electrolyte 38 is a continuous structure having a mesh pattern. The lithium ions move within the solid electrolyte 38. Then, since the solid electrolyte 38 in a mesh pattern fills the communication hole 37, a path in which lithium ions can move to every corner of the active material forming body 35 is secured. The solid electrolyte 38 is in a non-crystalline form, has low resistance of a grain boundary, and can thus make the lithium ions easy to move. As a result, the battery 15 can stably perform a charging-discharging cycle.

When the battery 15 is charged, the lithium ions in the solid electrolyte 38 move from the active material forming body 35 of the electrode composite 32 to the upper electrode 34. The upper electrode 34 is a negative electrode of a lithium film. Then, when the battery 15 is discharged, the lithium ions in the solid electrolyte 38 move from the upper electrode 34 to the active material forming body 35 of the electrode composite 32.

A lithium double oxide is used as a material for forming the active material particles 36. Note that the lithium double oxide is an oxide that always contains lithium, contains two or more kinds of metal ions, and does not contain oxoacid ions. Examples of the lithium double oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$.

In addition, solid solutions in which a part of atoms of these lithium double oxide is substituted with other transition metal, a typical metal, an alkali metal, an alkali rare earth, lanthanoid, chalcogenide, halogen, and the like may also be included in the lithium double oxide, and these solid solutions can also be used as positive electrode active materials. In the present exemplary embodiment, for example, $LiCoO_2$ is used for the active material particles 36.

$Li_2+XC_1-XBXO_3$ is used for a material of the solid electrolyte 38. X is a substitution rate of boron B and represents a real number greater than 0 and less than or equal to 1. Therefore, $Li_2CO_3$ when X is 0 is not included in the solid of the solid electrolyte 38, and $Li_3BO_3$ when X is 1 is included. Then, in the communication hole 37, the solid electrolyte 38 is non-crystalline.

Second Exemplary Embodiment

The present exemplary embodiment is different from the first exemplary embodiment in a point that the first opening 15*a* in the battery 15 is a slit. Note that configurations identical to those in the first exemplary embodiment will be denoted by the same reference signs and redundant descriptions will be omitted.

Figure 7:
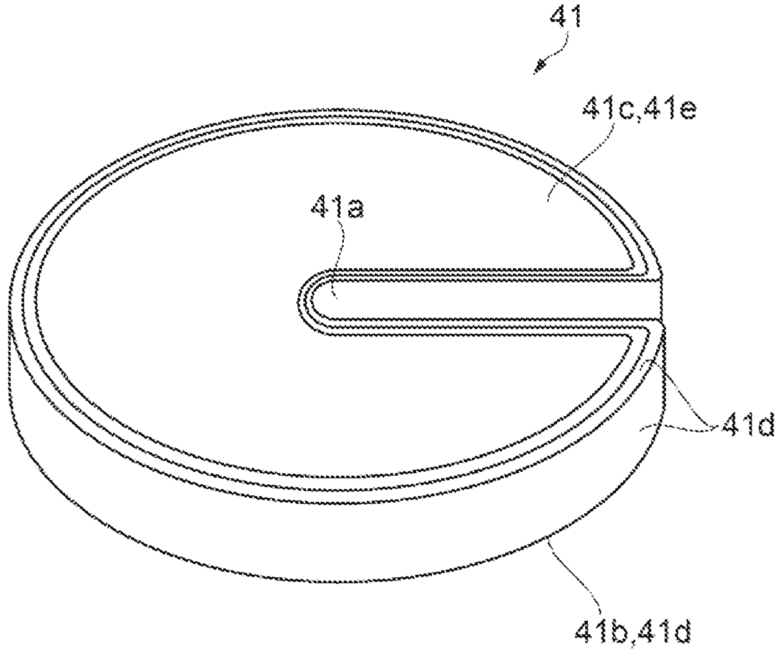
FIG. 7 is a schematic perspective view illustrating a configuration of a battery according to a second exemplary embodiment.

As illustrated in FIG. 7, a battery 41 includes a first electrode 41*d* having a bottomed cylindrical shape and a second electrode 41*e* having a circular shape. The first electrode 41*d* is disposed on a first surface 41*b* facing a dial 7 side and on a side surface. The second electrode 41*e* is disposed on a second surface 41*c* facing the movement 16.

The battery 41 has a first opening 41*a*. The first opening 41*a* is a slit extending from a place through which a hand shaft 8 passes toward an outer circumference of the battery 41. According to this configuration, since the first opening 41*a* is a slit, the hand shaft 8 can pass through the first opening 41*a*. Further, an operator can put in and take out the battery 41 between the dial 7 and the movement 16 by moving the battery 41 toward the side surface.

Third Exemplary Embodiment

The present exemplary embodiment is different from the first exemplary embodiment in a point that the size of the battery 15 is increased. Note that configurations identical to those in the first exemplary embodiment will be denoted by the same reference signs and redundant descriptions will be omitted.

Figure 8:
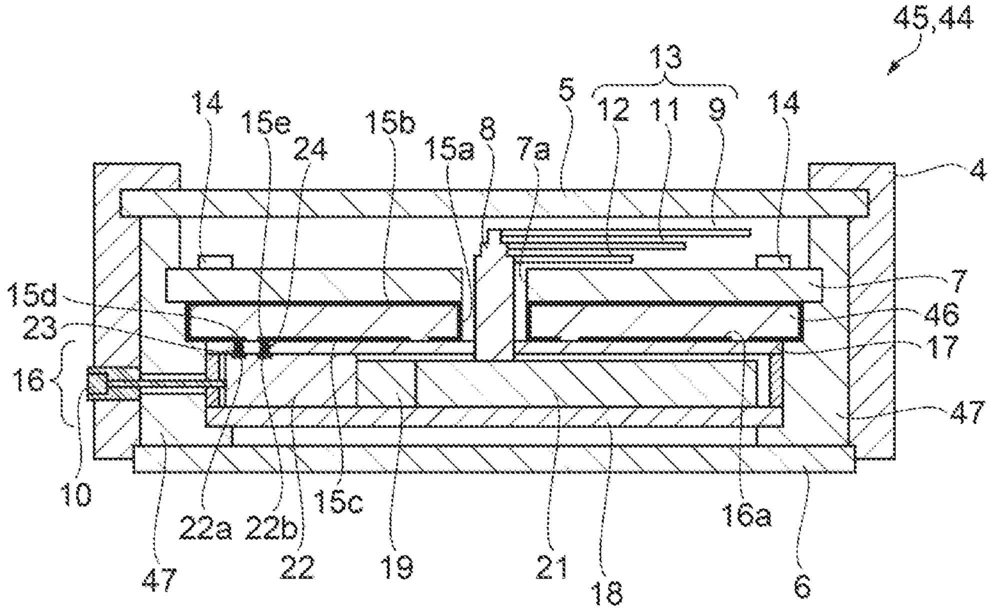
FIG. 8 is a schematic side cross-sectional view illustrating a configuration of an electronic watch according to a third exemplary embodiment.

As illustrated in FIG. 8, in a watch body 45 of an electronic watch 44, a battery 46 is disposed between a dial 7 and a movement 16. A position of the dial 7, the battery 46, and the movement 16 in a thickness direction of the watch body 45 is determined by a guide frame 47. In plan view viewed from an axial direction of a hand shaft 8, the size of the battery 46 is larger than that of the movement 16 and is smaller than that of the dial 7.

According to this configuration, in the plan view viewed from the axial direction of the hand shaft 8, capacity of the battery 46 can be increased further than that when the size of the battery 46 is smaller than that of the movement 16.

Fourth Embodiment

The present exemplary embodiment is different from the first exemplary embodiment in a point that a date indicator is disposed. Note that configurations identical to those in the first exemplary embodiment will be denoted by the same reference signs and redundant descriptions will be omitted.

Figure 9:
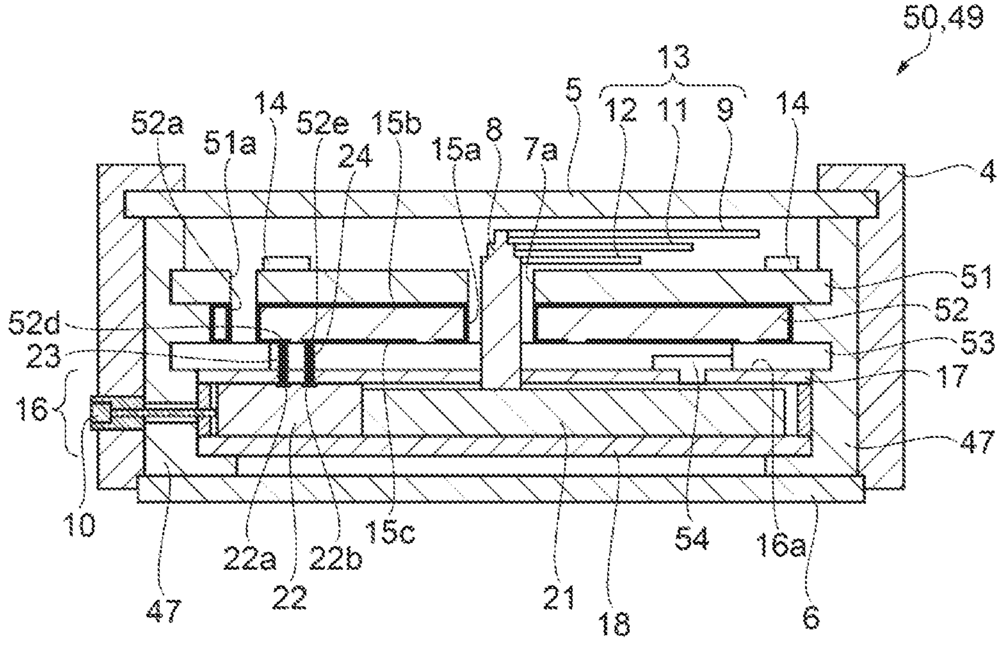
FIG. 9 is a schematic side cross-sectional view illustrating a configuration of an electronic watch according to a fourth exemplary embodiment.

As illustrated in FIG. 9, a watch body 50 of an electronic watch 49 includes a dial 51 corresponding to the dial 7 in the first exemplary embodiment and a battery 52 corresponding to the battery 15. The battery 52 is disposed on a back side of the dial 51. The electronic watch 49 includes a date indicator 53 and a date indicator driving wheel 54 between the battery 52 and a movement 16. The date indicator driving wheel 54 is driven by a train wheel mechanism 21, and the date indicator driving wheel 54 rotates the date indicator 53.

In plan view viewed from an axial direction of a hand shaft 8, the size of the battery 52 is larger than an inside diameter of the date indicator 53 and is smaller than the size of the movement 16. According to this configuration, in the plan view viewed from the axial direction of the hand shaft 8, the battery 52 can have the size that does not protrude from the movement 16. Further, capacity of the battery 52 can be increased further than that when the size of the battery 52 is smaller than the inside diameter of the date indicator 53.

The dial 51 includes a date window 51*a* through which a mark described at the date indicator 53 is visible. This mark is a number indicating a date. "1" of a first day and "31" of a 31st day correspond to the mark. The battery 52 has a second opening 52*a* in a position corresponding to the date window 51*a*. According to this configuration, since the battery 52 has the second opening 52*a* in the position corresponding to the date window 51*a*, an operator can confirm the mark of the date indicator 53 through the date window 51*a* and the second opening 52*a*.

The movement 16 includes, at an upper surface 16*a* facing the battery 52, a third electrode 22*a* and a fourth electrode 22*b* that are electrically coupled to the battery 52. The battery 52 includes a first electrode 52*d* and a second electrode 52*e*, and the first electrode 52*d* is disposed on an outer circumferential side of the battery 52.

According to this configuration, the third electrode 22*a* is disposed at an end portion of the upper surface 16*a*. The third electrode 22*a* is closer to the first electrode 52*d* than when the third electrode 22*a* is disposed at the center of the upper surface 16*a*. Therefore, the battery 52 and the movement 16 can be easily electrically coupled to each other.

Fifth Exemplary Embodiment

The present exemplary embodiment is different from the first exemplary embodiment in a point that an electrode electrically in contact with the side surface of the battery 15 is disposed. Note that configurations identical to those in the first exemplary embodiment will be denoted by the same reference signs and redundant descriptions will be omitted.

Figure 10:
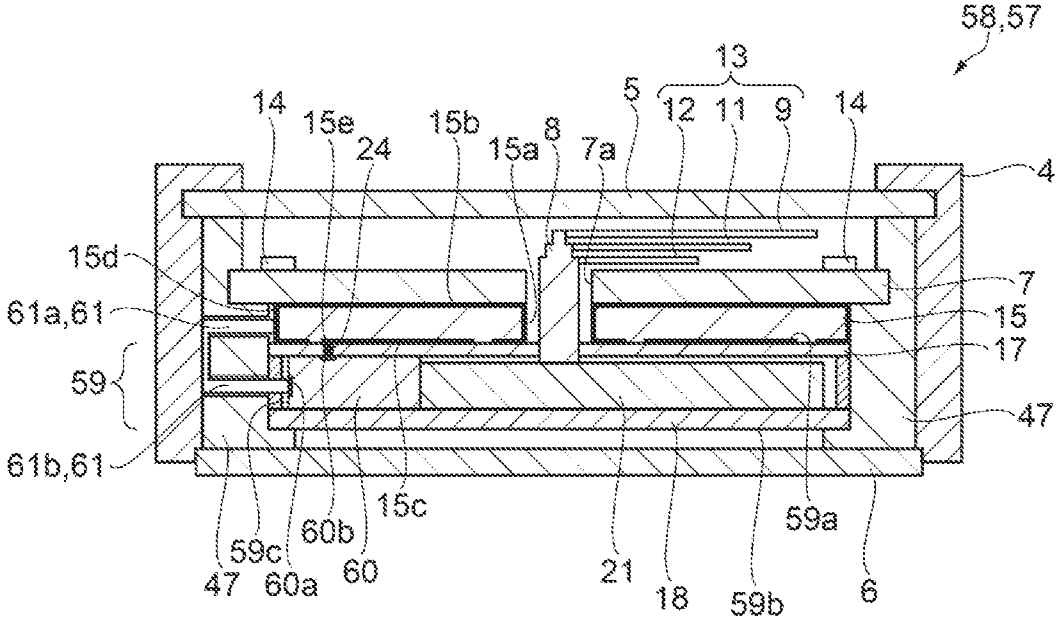
FIG. 10 is a schematic side cross-sectional view illustrating a configuration of an electronic watch according to a fifth exemplary embodiment.

As illustrated in FIG. 10, a watch body 58 of an electronic watch 57 includes a battery 15 and a movement 59. The movement 59 corresponds to the movement 16 in the first exemplary embodiment. The movement 59 includes a circuit portion 60 corresponding to the circuit portion 22 in the first exemplary embodiment. The circuit portion 60 includes a fourth electrode 60*b* at an upper surface 59*a* side of the movement 59. A second electrode 15*e* of the battery 15 and the fourth electrode 60*b* are electrically coupled to each other by a second spring 24.

The battery 15 includes a first electrode 15*d* on a side surface. The first electrode 15*d* is electrically coupled to a first end 61*a* of a coupling terminal 61. The circuit portion 60 includes a third electrode 60*a* as an electrode on a side surface 59*c*. The third electrode 60*a* is electrically coupled to a second end 61*b* of the coupling terminal 61. The first end 61*a* and the second end 61*b* are plate springs. The first end 61*a* presses the first electrode 15*d*. The second end 61*b* presses the third electrode 60*a*. A material of the coupling terminal 61 is metal, and the first end 61*a* and the second end 61*b* are electrically coupled to each other. Therefore, the first electrode 15*d* and the third electrode 60*a* are electrically coupled to each other by the coupling terminal 61. Note that it is assumed that the coupling terminal 61 and an outer case 4 are electrically insulated.

The movement 59 includes the third electrode 60*a* electrically coupled to the battery 15 on the side surface 59*c* side being a surface parallel to a rotary shaft of a hand shaft 8. According to this configuration, when the movement 59 includes the third electrode 60*a* on the side surface 59*c*, the side surface 59*c* is closer to the battery 15 than a lower surface 59*b*, thereby facilitating electrical coupling to the battery 15. Note that "parallel" also includes "substantially parallel".

Sixth Exemplary Embodiment

The present exemplary embodiment is different from the fourth exemplary embodiment in a point that an electrode electrically in contact with the side surface of the battery 52 is disposed. Note that configurations identical to those in the fourth exemplary embodiment will be denoted by the same reference signs and redundant descriptions will be omitted.

Figure 11:
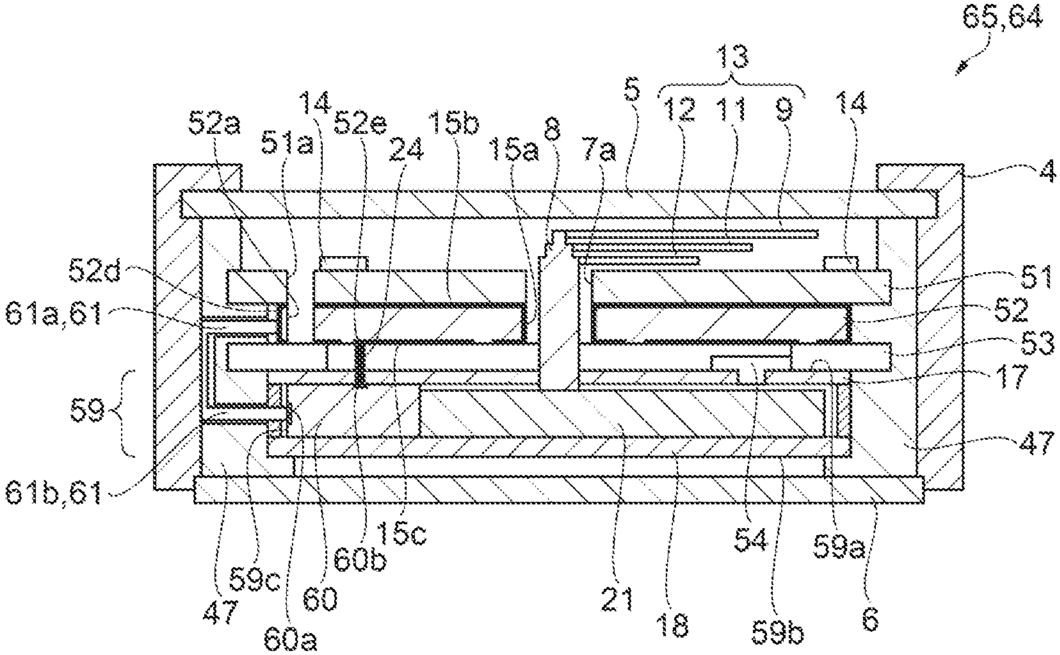
FIG. 11 is a schematic cross-sectional view illustrating a configuration of an electronic watch according to a sixth exemplary embodiment.

As illustrated in FIG. 11, a watch body 65 of an electronic watch 64 includes a dial 51, a battery 52, a date indicator 53, a date indicator driving wheel 54, and a movement 59. The dial 51 includes a date window 51*a*. The battery 52 has a second opening 52*a*. A mark on the date indicator 53 is visible through the date window 51*a* and the second opening 52*a*.

The movement 59 includes a circuit portion 60. The circuit portion 60 includes a fourth electrode 60*b* at an upper surface 59*a* facing the front side. A second electrode 52*e* and the fourth electrode 60*b* are electrically coupled to each other by a second spring 24.

The battery 52 includes a first electrode 52*d* on a side surface. The first electrode 52*d* is electrically coupled to a first end 61*a* of a coupling terminal 61. The circuit portion 60 includes a third electrode 60*a* on a side surface 59*c*. The third electrode 60*a* is electrically coupled to a second end 61*b* of the coupling terminal 61. A material of the coupling terminal 61 is metal, and the first end 61*a* and the second end 61*b* are electrically coupled to each other. Therefore, the first electrode 52*d* and the third electrode 60*a* are electrically coupled to each other by the coupling terminal 61.

The movement 59 includes the third electrode 60*a* electrically coupled to the battery 52 on the side surface 59*c* being a surface parallel to a rotary shaft of a hand shaft 8. According to this configuration, since the third electrode 60*a* is disposed on the side surface 59*c* of the movement 59, the third electrode 60*a* is closer to the first electrode 52*d* of the battery 52 than when the electrode is disposed at the center of the upper surface 59*a* of the movement 59. Therefore, the battery 52 and the movement 59 can be easily electrically coupled to each other. Note that "parallel" also includes "substantially parallel".

Seventh Exemplary Embodiment

The present exemplary embodiment is different from the first exemplary embodiment in a point that an electrode protruding in a radial direction farther than an outer circumference of the second surface 15*c* is disposed on the first surface 15*b* side of the battery 15. Note that configurations identical to those in the first exemplary embodiment will be denoted by the same reference signs and redundant descriptions will be omitted.

Figure 12:
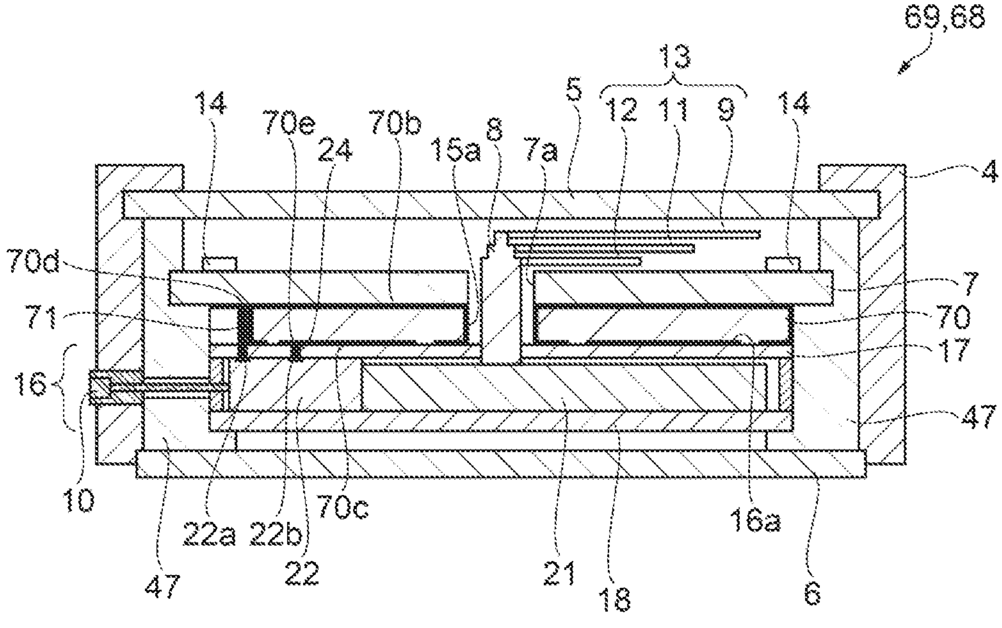
FIG. 12 is a schematic side cross-sectional view illustrating a configuration of an electronic watch according to a seventh exemplary embodiment.

As illustrated in FIG. 12, a watch body 69 of an electronic watch 68 includes a battery 70 between a dial 7 and a movement 16. The movement 16 includes a circuit portion 22. The circuit portion 22 of the movement 16 includes a third electrode 22*a* and a fourth electrode 22*b* at an upper surface 16*a* facing the front side. The battery 70 includes a second electrode 70*e* on a second surface 70*c* facing the movement 16. The second electrode 70*e* and the fourth electrode 22*b* are electrically coupled to each other by a second spring 24.

The battery 70 includes a first electrode 70*d* on a first surface 70*b* on the side facing the dial 7. Therefore, the battery 70 includes the first surface 70*b* including the first electrode 70*d*, and the second surface 70*c* including the second electrode 70*e* on a side opposite to the first surface 70*b*. The first electrode 70*d* protrudes in the radial direction farther than the outer circumference of the second surface 70*c*. The first electrode 70*d* and the third electrode 22*a* are electrically coupled to each other by a first spring 71. The second spring 24 and the first spring 71 are linear coil springs.

According to this configuration, since the second surface 70*c* faces the movement 16, the second electrode 70*e* and the fourth electrode 22*b* can be easily electrically coupled to each other. Since the first electrode 70*d* protrudes in the radial direction from the outer circumference of the second surface 70*c*, the first electrode 70*d* and the third electrode 22*a* can be electrically coupled to each other by the linear coil spring. Therefore, the first electrode 70*d* and the third electrode 22*a* can be easily electrically coupled to each other.

Eighth Exemplary Embodiment

In the first exemplary embodiment described above, a planar shape of the watch body 2, the dial 7, and the battery 15 is circular. A planar shape of the watch body 2, the dial 7, and the battery 15 may be rectangular. The production efficiency of the battery 15 can be improved.

Ninth Exemplary Embodiment

In the first exemplary embodiment described above, the power supply connector 10 is installed on the side surface of the outer case 4. The power supply connector 10 may be installed on the case back 6. Electrical conduction through the power supply connector 10 can be easily performed. In addition, a power generating unit such as a solar that supplies power to the battery 15 may be provided instead of providing the power supply connector 10.

Tenth Exemplary Embodiment

In the first exemplary embodiment described above, a global positioning system (GPS) is not mounted. The GPS may be disposed on the movement 16. A through hole may be formed in the battery 15 at a place facing an antenna of the GPS. The antenna can receive radio waves with excellent sensitivity.

What is claimed is:

1. An electronic watch, comprising:
a hand configured to indicate time;
a dial having a through hole through which a hand shaft configured to rotate the hand passes;
a movement including a motor configured to rotate the hand shaft, and a circuit electrically coupled to the motor;
a battery electrically coupled to the circuit and configured to supply power to the motor; and
a date indicator between the battery and the movement, wherein
the battery is disposed between the dial and the movement, and the battery has a first opening through which the hand shaft passes, and
in a plan view viewed from an axial direction of the hand shaft, a size of the battery is larger than an inside diameter of the date indicator.

2. The electronic watch according to claim 1, wherein
the first opening is a through hole, or a slit extending from a place through which the hand shaft passes toward an outer circumference of the battery.

3. The electronic watch according to claim 1, wherein
the size of the battery is the same as a size of the movement in the plan view.

4. The electronic watch according to claim 1, wherein
the size of the battery is larger than a size of the movement in the plan view.

5. The electronic watch according to claim 1, wherein
the size of the battery is smaller than a size of the movement in the plan view.

6. The electronic watch according to claim 1, wherein
the movement includes, at an upper surface facing the battery or at a side surface being a surface parallel to a rotary shaft of the hand shaft, an electrode electrically coupled to the battery.

7. The electronic watch according to claim 1 wherein
the dial includes a date window through which a mark described at the date indicator is visible, and
the battery has a second opening in a position corresponding to the date window.

8. The electronic watch according to claim 7, wherein
the movement includes, at an end portion of an upper surface facing the battery or at a side surface being a surface parallel to a rotary shaft of the hand shaft, an electrode electrically coupled to the battery.

9. The electronic watch according to claim 1, wherein
the battery includes a first surface including a first electrode, and a second surface including a second electrode on a side opposite to the first surface,
the movement includes a third electrode and a fourth electrode,
the first electrode and the third electrode are electrically coupled to each other by a first spring, and the second electrode and the fourth electrode are electrically coupled to each other, and
the second surface faces the movement, and the first electrode protrudes further in a radial direction than an outer circumference of the second surface.

10. The electronic watch according to claim 1, wherein
the battery is an all-solid battery.

* * * * *